US010681343B2

(12) United States Patent
Jones

(10) Patent No.: US 10,681,343 B2
(45) Date of Patent: Jun. 9, 2020

(54) DIGITAL CLOSED CAPTION CORRUPTION REPORTING

(71) Applicant: AT&T Intellectual Property I, L.P., Atlanta, GA (US)

(72) Inventor: Todd Jones, Kansas City, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/705,606

(22) Filed: Sep. 15, 2017

(65) Prior Publication Data

US 2019/0089951 A1 Mar. 21, 2019

(51) Int. Cl.
*H04N 17/00* (2006.01)
*H04N 5/278* (2006.01)
*H04N 19/46* (2014.01)
*H04N 21/488* (2011.01)
*H04N 21/44* (2011.01)
*H04N 19/44* (2014.01)
(Continued)

(52) U.S. Cl.
CPC ........... *H04N 17/004* (2013.01); *H04N 5/278* (2013.01); *H04N 19/44* (2014.11); *H04N 19/46* (2014.11); *H04N 21/4348* (2013.01); *H04N 21/44008* (2013.01); *H04N 21/44209* (2013.01); *H04N 21/4882* (2013.01); *H04N 21/4884* (2013.01); *H04N 2017/008* (2013.01)

(58) Field of Classification Search
CPC ............. H04N 21/4884; H04N 7/0885; H04N 21/2353; H04N 21/235; H04N 21/47202; H04N 7/0882; H04N 21/2187; H04N 21/234336; H04N 21/44008; H04N 9/8227; H04N 5/445; H04N 2017/008; H04N 21/23614; H04N 17/004; H04N 19/44; H04N 5/278; H04N 19/46
See application file for complete search history.

(56) References Cited

U.S. PATENT DOCUMENTS 7,006,151 B2 2/2006 Dieterich
8,149,330 B2 4/2012 Streijl
8,265,450 B2 9/2012 Black et al.
(Continued)

FOREIGN PATENT DOCUMENTS

CN 102164248 10/2014

*Primary Examiner* — Mulugeta Mengesha
*Assistant Examiner* — Alazar Tilahun
(74) *Attorney, Agent, or Firm* — Hartman & Citrin LLC

(57) ABSTRACT

Concepts and technologies disclosed herein are directed to closed caption corruption detection and reporting. In accordance with one aspect disclosed herein, a system can ingest a digital video channel bitstream. The system can locate a digital closed caption flag in the digital video channel bitstream. The digital closed caption flag can indicate that a digital closed caption content packet is present within the digital video channel bitstream. The system can determine that at least a portion of the digital closed caption content packet cannot be rendered to display closed caption content associated with at least the portion of the digital closed caption content packet. The system can instantiate an alert based on the determination that at least the portion of the digital closed caption content packet cannot be rendered to display the closed caption content associated with at least the portion of the digital closed caption content packet.

20 Claims, 7 Drawing Sheets

(51) Int. Cl.
*H04N 21/434* (2011.01)
*H04N 21/442* (2011.01)

(56) References Cited

U.S. PATENT DOCUMENTS

| | | |
|---|---|---|
| 8,692,936 B2 | 4/2014 | Polumbus et al. |
| 9,426,479 B2 | 8/2016 | Shaffer |
| 9,535,891 B2 | 1/2017 | Raheja et al. |
| 9,620,118 B2 | 4/2017 | Pham |
| 9,680,906 B2 | 6/2017 | Orzell et al. |
| 9,696,881 B2 | 7/2017 | Pornprasitsakul et al. |
| 2009/0094659 A1 | 4/2009 | Candelore |
| 2010/0020234 A1* | 1/2010 | Smith .................... H04N 5/445 348/468 |
| 2011/0231180 A1* | 9/2011 | Padi ...................... G06F 17/289 704/3 |
| 2012/0143606 A1* | 6/2012 | Pham ..................... G10L 15/26 704/235 |
| 2013/0089202 A1* | 4/2013 | Altmann ............ H04N 21/4122 380/211 |
| 2015/0109462 A1* | 4/2015 | Anantwar .......... H04N 21/2353 348/192 |
| 2016/0198227 A1* | 7/2016 | Singh ................ H04N 21/4622 725/32 |
| 2017/0139904 A1 | 5/2017 | Dakss et al. |

* cited by examiner

DIGITAL CLOSED CAPTION CORRUPTION REPORTING

BACKGROUND

Closed captioning includes a textual representation of spoken dialog and other sounds corresponding to video that can be displayed on viewing devices. Historically, analog broadcasts were used to provide analog televisions with analog television signals. The analog television signals typically included an audio signal and a video signal. In the analog television signals, closed captioning was stored in a non-visible, active video data area of the analog video signal, such as a vertical blanking interval of the analog video signal. With the advent of the digital age, the mechanisms for distributing video content transitioned away from analog broadcasts and toward digital bitstreams that include closed captioning data. In some instances of digital bitstreams, closed captioning data may contain errors. A decoder in a viewing device, such as a digital television set, set-top box, or mobile communication device, may decode closed captioning data for display as text in a picture area on a display of the viewing device. Sometimes, however, the closed captioning text is out-of-sync, incorrect (e.g., missing letters or words), or even illegible. These errors may be caused by transcription errors, by decoding malfunctions on the viewing device, or other problems in the distribution network that delivers the closed captioning data. Problems with closed captions can detract from the effectiveness, and purpose, of providing closed captions to a viewer device and can impact a quality of experience.

SUMMARY

The present disclosure is directed to digital closed caption corruption reporting for video content distribution systems via a network. According to one aspect of the concepts and technologies disclosed herein, a method is disclosed. The method can include ingesting, by a computing system comprising a processor, a digital video channel bitstream. In some instances, the digital video channel bitstream can correspond to one channel among multiple channels, where multiple digital video channel bitstreams can collectively be included in a digital video multichannel bitstream. The computing system can ingest the digital video channel bitstream from a closed caption encoder. The closed caption encoder can isolate the digital video channel bitstream from the digital video multichannel bitstream prior to the computing system ingesting the digital video channel bitstream. The digital video channel bitstream can include digital closed caption data and analog closed caption data. As used herein, the term "ingest", and variants thereof, is intended to include the computing system at least receiving, via a communication interface, files and data of the digital video (multi)channel bitstream in a sequential and/or non-sequential order for processing and analysis. In some instances, the digital closed caption data can include a digital closed caption flag. The method can include locating, by the computing system, the digital closed caption flag in the digital video channel bitstream. The digital closed caption flag can indicate that a digital closed caption content packet is present within the digital video channel bitstream. The method can include verifying, by the computing system, that at least one closed caption service has been assigned to digital closed caption data corresponding to the digital closed caption flag. The method can include identifying, by the computing system, closed caption hexadecimal data following the digital closed caption flag. The method also can include determining, by the computing system, that at least a portion of the digital closed caption content packet cannot be rendered to display the closed caption content associated with at least the portion of the digital closed caption content packet. In some instances, the closed caption hexadecimal data can include at least the portion of the digital closed caption content packet that cannot be rendered. In some instances, at least the portion of the digital closed caption content packet cannot be rendered due to at least one of the digital closed caption content packet missing the closed caption content associated with at least the portion of the digital closed caption content packet or at least the portion of the digital closed caption content packet being corrupt. In some embodiments, the method also can include, confirming, by the computing system, that a closed caption decoder will fail to recognize the digital closed caption data as having an error.

The method also can include determining, by the computing system, that the digital video channel bitstream contains an analog closed caption flag. The analog closed caption flag can indicate that an analog closed caption content packet is present within analog data of the digital video channel bitstream and can be rendered for display of closed caption content associated with the analog closed caption content packet. The method can include verifying, by the computing system, that at least one closed caption service has been assigned to the analog closed caption data of the digital video channel bitstream. The method also can include instantiating, by the computing system, an alert at least based on determining that at least the portion of the digital closed caption content packet cannot be rendered to display the closed caption content associated with at least the portion of the digital closed caption content packet. In some instances, the method can include creating, by the computing system, a prompt to authorize use of the closed caption content from the analog closed caption data when at least the portion of the digital closed caption content packet cannot be rendered to display the closed caption content associated with at least the portion of the digital closed caption content packet.

According to another aspect of the concepts and technologies disclosed herein, a system for closed caption corruption reporting is disclosed. The system can include a processor and a memory. The method can store computer-executable instructions that, in response to being executed by the processor, cause the processor to perform operations. The operations can include ingesting a digital video channel bitstream. In some instances, the digital video channel bitstream can correspond to one channel among multiple channels, where multiple digital video channel bitstreams can collectively be included in a digital video multichannel bitstream. In some embodiments, the system can ingest the digital video channel bitstream from a closed caption encoder. The closed caption encoder can isolate the digital video channel bitstream from the digital video multichannel bitstream prior to the system ingesting the digital video channel bitstream. The digital video channel bitstream can include digital closed caption data and analog closed caption data. In some instances, the digital closed caption data can include a digital closed caption flag. The operations further can include locating the digital closed caption flag in the digital video channel bitstream. The digital closed caption flag can indicate that a digital closed caption content packet is present within the digital video channel bitstream.

The operations further can include verifying that at least one closed caption service has been assigned to digital closed caption data corresponding to the digital closed caption flag. The operations can include identifying closed caption hexadecimal data following the digital closed caption flag. The operations also can include determining that at least a portion of the digital closed caption content packet cannot be rendered to display the closed caption content associated with at least the portion of the digital closed caption content packet. In some instances, the closed caption hexadecimal data can include at least the portion of the digital the closed caption content packet that cannot be rendered. In some instances, at least the portion of the digital closed caption content packet cannot be rendered due to at least one of the digital closed caption content packet missing the closed caption content associated with at least the portion of the digital closed caption content packet or at least the portion of the digital closed caption content packet being corrupt. In some embodiments, the operations also can include confirming that a closed caption decoder will fail to recognize the digital closed caption data as having an error.

The operations also can include determining that the digital video channel bitstream contains an analog closed caption flag. The analog closed caption flag can indicate that an analog closed caption content packet is present within analog data of the digital video channel bitstream and can be rendered for display of closed caption content associated with the analog closed caption content packet. The operations can include verifying that at least one closed caption service has been assigned to the analog closed caption data of the digital video channel bitstream. The operations also can include instantiating an alert at least based on determining that at least the portion of the digital closed caption content packet cannot be rendered to display the closed caption content associated with at least the portion of the digital closed caption content packet. In some instances, the operations can include creating a prompt to authorize use of the closed caption content from the analog closed caption data when at least the portion of the digital closed caption content packet cannot be rendered to display the closed caption content associated with at least the portion of the digital closed caption content packet.

According to yet another aspect, a computer storage medium is disclosed. The computer storage medium can have computer-executable instructions stored thereon. When the computer-executable instructions are executed by a processor, the processor can perform operations including ingesting a digital video channel bitstream. In some instances, the digital video channel bitstream can correspond to one channel among multiple channels, where multiple digital video channel bitstreams can collectively be included in a digital video multichannel bitstream. In some embodiments, the digital video channel bitstream can be ingested from a closed caption encoder. The closed caption encoder can isolate the digital video channel bitstream from the digital video multichannel bitstream prior to the system ingesting the digital video channel bitstream. The digital video channel bitstream can include digital closed caption data and analog closed caption data. In some instances, the digital closed caption data can include a digital closed caption flag. The operations further can include locating the digital closed caption flag in the digital video channel bitstream. The digital closed caption flag can indicate that a digital closed caption content packet is present within the digital video channel bitstream.

The operations further can include verifying that at least one closed caption service has been assigned to digital closed caption data corresponding to the digital closed caption flag. The operations can include identifying closed caption hexadecimal data following the digital closed caption flag. The operations also can include determining that at least a portion of the digital closed caption content packet cannot be rendered to display closed caption content associated with at least the portion of the digital closed caption content packet. In some instances, the closed caption hexadecimal data can include at least the portion of the digital closed caption content packet that cannot be rendered. In some instances, at least the portion of the digital closed caption content packet cannot be rendered due to at least one of the digital closed caption content packet missing the closed caption content associated with at least the portion of the digital closed caption content packet or at least the portion of the digital closed caption content packet being corrupt. In some embodiments, the operations also can include confirming that a closed caption decoder will fail to recognize the digital closed caption data as having an error.

The operations also can include determining that the digital video channel bitstream contains an analog closed caption flag. The analog closed caption flag can indicate that an analog closed caption content packet is present within analog data of the digital video channel bitstream and can be rendered for display of the closed caption content associated with the analog closed caption content packet. The operations can include verifying that at least one closed caption service has been assigned to the analog closed caption data of the digital video channel bitstream. The operations also can include instantiating an alert at least based on the determination that at least the portion of the digital closed caption content packet cannot be rendered to display the closed caption content associated with at least the portion of the digital closed caption content packet. In some instances, the operations can include creating a prompt to authorize use of the closed caption content from the analog closed caption data when at least the portion of the digital closed caption content packet cannot be rendered to display the closed caption content associated with at least the portion of the digital closed caption content packet.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
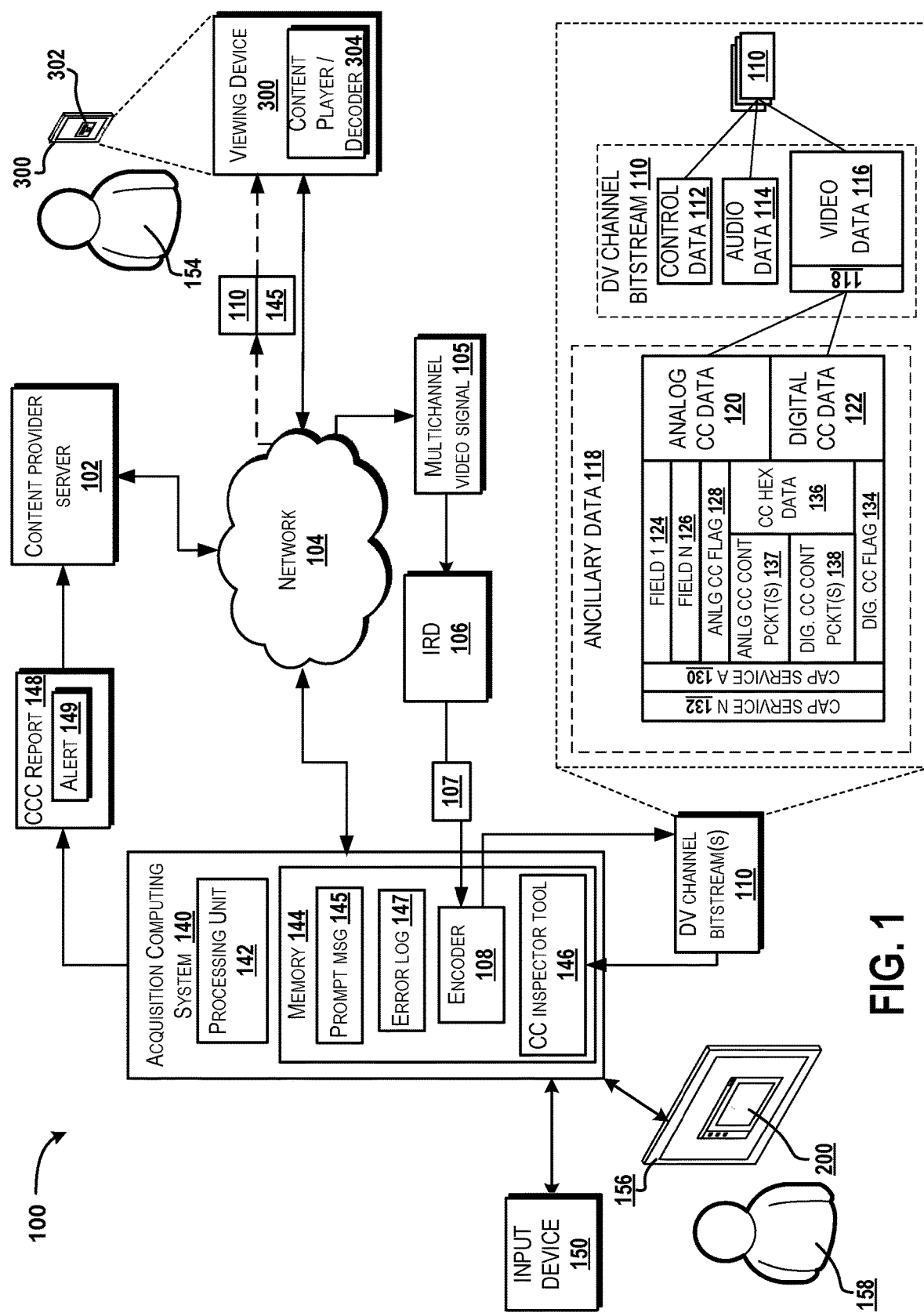
FIG. 1 is a system diagram showing an illustrative operating environment for various embodiments of the concepts and technologies described herein.

The following detailed description is directed to digital closed caption corruption reporting. Early closed caption technology appeared in analog television broadcasts, thereby allowing the hard of hearing to watch television programming with textual representation of the spoken words and sounds. With the transition to the digital age, closed captions have become ubiquitous across digital television broadcasts and are a growing presence in network video streams. Although closed captions appear to the end user as simply text displayed below or on top of a video, the technology supporting digital closed captions can be complex. Conventionally, when a user, who is watching video content on a viewing device, requests closed captions to be shown on the viewing device, a content player will decode closed captions from the data encoded in the video content file and then present the decoded closed caption content on a display of the viewing device. In normal operation, the closed caption content (e.g., text and characters corresponding to the spoken dialog) will be synchronized with the video content being shown on the viewing device. In some instances, closed caption content may not be encoded for a video content file and thus will not be available for the viewing device to decode. When closed caption content is not present within the video content file, a closed caption flag should not be present or placed within video data by the encoder because the closed caption flag is used to indicate the presence of closed caption content. However, as a video content distributor system acquires multichannel video content from various service providers via a network and/or terrestrial or satellite radio frequency transmissions, digital closed captioning data can be encoded inconsistently or become corrupted. In some instances, an encoder may trigger a digital closed caption flag to be present even though errors have occurred during an encoding process. This inadvertently may cause a decoder to not recognize that an error has occurred until the decoder attempts to decode the portion of digital closed caption data containing the error. Moreover, a user may not be aware of alternatives to the digital closed caption data, thereby affecting the quality of experience. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, routers, switches, other particularized, non-generic computing devices described herein, and the like.

Referring now to FIG. 1, aspects of a system 100 for various embodiments of the concepts and technologies disclosed herein for closed caption corruption reporting will be described, according to an illustrative embodiment. The system 100 shown in FIG. 1 is illustrated as including a content provider server 102, a communications network ("network") 104, an integrated receiver/decoder ("IRD") 106, a closed caption encoder ("encoder") 108, an acquisition computing system (ACS) 140, a display device 156, an input device 150, and a viewing device 300. It must be understood that although the system 100 shows one content provider server 102, one network 104, one IRD 106, one encoder 108, one ACS 140, one display device 156, one input device 150, and one viewing device 300, various embodiments of the concepts and technologies disclosed herein include versions of the system 100 having almost any number of the content provider servers 102, the networks 104, the IRD 106, the encoders 108, the ACS 140, the display devices 156, the input devices 150, and the viewing devices 300, where the number of each includes zero, one, tens, hundreds, thousands, or even more. As such, the illustrated embodiment must be understood as being illustrative and should not be construed as being limiting in any way. The content provider server 102, the IRD 106, the encoder 108, the ACS 140, the input device 150, and the display device 156 can operate in communication with each other and/or as part of the network 104. Additional details of the network 104 are illustrated and described below with reference to FIG. 5.

According to various embodiments, the functionality of the content provider server 102 may be provided by one or more web servers, desktop computers, other computing systems, and the like. It should be understood that the functionality of the content provider server 102 can be provided by a single device, by two similar devices, and/or by two or more dissimilar devices. For example, the functionality of the content provider server 102 can be provided by multiple servers in a server farm or other cloud computing platform, if desired. For purposes of describing the concepts and technologies disclosed herein, the content provider server 102 is described herein as a single device. An embodiment of the content provider server 102 can be a computer system, such as the computer system 600 which is discussed in further detail with respect to FIG. 6. Based on the above, however, it should be understood that the described embodiment is illustrative, and therefore should not be construed as being limiting in any way.

The content provider server 102 can store and provide video content files organized according to playback chronology for video content, where multiple content files can be transmitted via a multichannel video signal 105. Each video content file can correspond to one channel identifier and may include audio data, video data, control data, or a combination thereof. The multichannel video signal 105 can take the form of an analog signal. The multichannel video signal 105 can include multiple video content files corresponding to multiple channels or streams, such as multiple channels of television programming distributed by a service provider of communications and/or network services. A service provider may provide a distribution service for one or more content providers that utilize the content provider server 102, thereby allowing video content provided by the content provider server 102 to be eventually consumed by customers via one or more viewing devices, such as the viewing device 300 that can execute a content player and decoder (CPD)

304. According to various embodiments, the functionality of the viewing device 300 may be provided by one or more desktop computers, mobile telephones, smartphones, tablet computers, laptop computers, smart watches, web browsers (e.g., browser-based implementations of communication devices), set-top boxes, vehicle computing systems, server computers, other computing systems, and the like. It should be understood that the functionality of the viewing device 300 can be provided by a single device, by two or more similar devices, and/or by two or more dissimilar devices. For purposes of describing the concepts and technologies disclosed herein, the viewing device 300 is described herein as a smartphone having the CPD 304 to decode and playback video content files. Further discussion of the viewing device 300 is provided with respect to FIG. 3. It should be understood that this embodiment is illustrative, and should not be construed as being limiting in any way.

The multichannel video signal 105 can be broadcast to the IRD 106 via the network 104. In various embodiments, the transmission or broadcast of the multichannel video signal 105 can traverse the network 104 via fiber optics, terrestrial or satellite radio frequency transmission, a wireless transmission, a wired transmission, or any combination thereof. The IRD 106 can ingest the multichannel video signal 105 from the network 104. In some embodiments, the IRD 106 can include a standalone hardware device and/or a software tool that executes on a processing unit, such as a processing unit 142 of the acquisition computing system 140. It must be understood that the IRD 106 is not a customer premise equipment (e.g., a set-top box), but rather is located upstream from an encoder for the multichannel video signal 105, such as the encoder 108. The IRD 106 can be configured to convert the multichannel video signal 105 from an analog signal into a digital video multichannel bitstream, such as a digital video multichannel bitstream 107. In some embodiments, the IRD 106 can be located in a (re)broadcasting facility of the service provider so as to receive the multichannel video signal 105 from the network 104 and rebroadcast, forward, or otherwise transmit the digital video multichannel bitstream 107 to the encoder 108 of the ACS 140. The digital video multichannel bitstream 107 can include data corresponding to multiple channels, with each channel having a separate channel identifier. The IRD 106 can send the digital video multichannel bitstream 107 to the encoder 108 of the ACS 140 for encoding according to one or more video standards.

The illustrated ACS 140 includes the processing unit 142, a memory 144, a prompt message 145, an error log 147, the encoder 108, and a closed caption inspector tool (CCIT) 146. The processing unit 142 can be or can include one or more central processing units ("CPUs") configured with one or more processing cores. The processing unit 142 can be or can include one or more graphics processing units ("GPUs") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the processing unit 142 can be or can include one or more discrete GPUs. In some other embodiments, the processing unit 142 can be or can include CPU and GPU components that are configured in accordance with a co-processing CPU/GPU computing model, where the sequential part of an application executes on the CPU and the computationally-intensive part is accelerated by the GPU. The processing unit 142 can be or can include one or more field-programmable gate arrays ("FPGAs"). The processing unit 142 can be or can include one or more system-on-chip ("SoC") components along with one or more other components, including, for example, the memory 144. In some embodiments, the processing unit 142 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The processing unit 142 can be or can include one or more hardware components architected in accordance with an ARM architecture, available for license from ARM HOLDINGS of Cambridge, United Kingdom. Alternatively, processing unit 142 can be or can include one or more hardware components architected in accordance with an x86 architecture, such an architecture available from INTEL CORPORATION of Mountain View, Calif., and others. Those skilled in the art will appreciate the implementation of the processing unit 142 can utilize various computation architectures, and as such, the processing unit 142 should not be construed as being limited to any particular computation architecture or combination of computation architectures, including those explicitly disclosed herein.

The memory 144 can be or can include one or more hardware components that perform storage operations, including temporary and/or permanent storage operations. In some embodiments, the memory 144 include volatile and/or nonvolatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the processing unit 142. The encoder 108, the CCIT 146, the prompt message 145, the error log 147, and the digital video channel bitstream 110 can be stored in the memory 144.

The encoder 108 can include a software module that executes on a processing unit, such as the processing unit 142 of the ACS 140. The encoder 108 can include one or more communication interfaces that support and facilitate the communication of data via to a Serial Digital Interface (SDI) and/or a High-Definition Serial Digital Interface (HD-SDI). The encoder 108 can receive the digital video multichannel bitstream 107 from the IRD 106. In some embodiments, the encoder 108 can isolate one channel from among multiple channels of the digital video multichannel bitstream 107. For example, the encoder 108 can isolate one channel by determining a channel identifier corresponding to data from the digital video multichannel bitstream 107 and separating the data associated with the channel identifier. The encoder 108 can convert the channel from the digital video multichannel bitstream 107 into a compressed format, such as by encoding the data according to a video encoding standard. Examples of a video encoding standard can include, but should not be limited to, the H.264 MPEG-4 Part 10, Advanced Video Coding (MPEG-4 AVC) video encoding standard, the MPED-2 video encoding standard, H.263 video encoding standard, or MPED-4 Part 2 video encoding standard. By isolating, compressing, and/or encoding data corresponding to one channel from the multichannel video signal 105, the encoder 108 can create a digital video channel bitstream, such as a digital video channel bitstream 110.

The digital video channel bitstream 110 can include control data, audio data, and video data, such as control data 112, audio data 114, and video data 116. The digital video channel bitstream 110 can be encoded to conform to a digital domain standard defined by the Advance Television Systems Committee (ATSC). In some embodiments, the control data 112 can include program specific information, such as an event information table and a program mapping table. The program specific information can pertain to programming for the digital video channel bitstream 110, such as a program name, a start time, a duration, a genre, and content rating. The audio data 114 can be encoded with time indicators so as to be in sync with the video data 116 upon playback. The video data 116 can include video content packets that are arranged chronologically for playback upon being decoded, such as by the CPD 304 of the viewing device 300. The video data 116 can include ancillary data, such as ancillary data 118. In some embodiments, the ancillary data 118 can be carried in a transport channel of the video data 116. The ancillary data 118 can include analog closed caption data 120 and digital closed caption data 122. The encoder 108 can configure the ancillary data 118 such that the analog closed caption data 120 and the digital closed caption data 122 conform with one or more closed caption standards. For example, the analog closed caption data 120 can conform to the Electronic Industries Alliance 608 waveform specification (EIA-608) and the digital closed caption data 122 can conform to the Electronic Industries Alliance 708B digital closed captioning standard (EIA-708). Because some viewing devices may not be able to decode digital closed caption data 122 conforming to the EIA-708 standard, the ancillary data 118 can be configured to store and carry both the digital closed caption data 122 and the analog closed caption data 120 conforming to the EIA-608 standard.

In some embodiments, the analog closed caption data 120 can include one or more fields, such as a first field (field 1) 124 and at least a second field (field N) 126, where the term "N" denotes at least a second instance of a field. In some embodiments, one or more closed caption services, such as caption service A 130 through caption service N 132, can be assigned to the field 1 124 through the field N 126. The phrase "caption service" refers to text and characters that can provide closed caption according to a specific language and manner of text display via the use of closed caption channel data and extended data services (XDS) data. XDS data can include information such as, but not limited to Time of Day, Program Name, the Transmission Signal Identifier, and the Program Rating based on the Television Parental Guidelines. In some embodiments, Field 1 124 can be assigned (and thus correspond) to caption service A 130 which has caption channels labeled CC1 and/or CC2, and one or more text channels labeled T1 and/or T2. In some embodiments, field N 126 can be assigned (and thus correspond) to caption service N which has caption channels labeled CC3 and/or CC4, and one or more text channels labeled T3 and/or T4. The field N 126 also can include XDS data.

The encoder 108 can encode the digital video channel bitstream 110 so as to indicate the presence of analog closed caption content (i.e., characters and text that provide description of spoken dialog and/or sounds for the video and which can be decoded according to an analog closed caption standard, such as EIA-608). Analog closed caption content can be provided in at least one analog closed caption content packet 137, which in turn can be encoded and carried in closed caption hexadecimal data, such as closed caption hexadecimal data 136. To indicate when the digital video channel bitstream 110 carries analog closed caption content, the encoder 108 can create, insert, or otherwise provide an analog closed caption flag, such as the analog closed caption flag 128. When the analog closed caption flag 128 is present (i.e., existing within the digital video channel bitstream 110), then each of the analog closed caption content packets 137 should contain analog closed caption content. In some embodiments, the analog closed caption flag 128 can include a binary digit (e.g., zero) and/or a character (or string thereof) indicating that an analog closed caption content packet 137 is present and can be rendered for display of analog closed caption content. The CCIT 146 can search for the analog closed caption flag 128 within the analog closed caption data 120. The CCIT 146 can use the presence of the analog closed caption flag 128 as a marker signifying that the closed caption hexadecimal data 136 should exist and should contain the analog closed caption content packets 137 that have analog closed caption content. In some instances, the CCIT 146 can confirm that the analog closed caption content packet 137 contains analog closed caption content and can be rendered by verifying that no null values exist (i.e., null values are not present) within the analog closed caption content packets 137 of the closed caption hexadecimal data 136.

Typically, the encoder 108 should convert and encode the digital closed caption data 122 so that digital closed caption content (i.e., characters and text that provide description of spoken dialog and/or sounds for the video and which can be decoded according to a digital closed caption standard, such as EIA-708) is present within digital closed caption content packets 138. The encoder 108 should indicate the presence of the digital closed caption content by creating, inserting, or otherwise providing a digital closed caption flag, such as a digital closed caption flag 134. When the digital closed caption flag 134 is present, then each of the digital closed caption content packets 138 should contain digital closed caption content. The digital closed caption flag 134 can be distinct from the analog closed caption flag 128, such as a unitary binary digit (e.g., one) and/or a character (or string thereof) indicating that a digital closed caption content packet 138 is present. In some embodiments, the ancillary data 118 can include a header, a footer, and an ancillary data flag indicating that ancillary data 118 is present within the video data 116.

In some embodiments, the encoder 108 may encode digital closed caption content by converting analog closed caption content from the analog closed caption content packets 137 and/or from data in the multichannel video signal 105. In typical circumstances, the encoder 108 encodes the digital closed caption content packets 138 without error such that the digital closed caption content packets 138 contain digital closed caption content. The encoder 108 may detect any corrupt, missing, and/or anomalous data prior to the digital video channel bitstream 110 being sent to the CCIT 146. In some embodiments, one or more checksum values and/or a parity bit may be used by the encoder 108 to verify and authenticate that closed caption content exists. However, in some embodiments, the encoder 108 may corrupt at least a portion of the digital closed caption content and/or cause at least a portion of the digital closed caption content to not exist within the digital closed caption content packets 138. Because of a faulty encoding process or other anomaly with the encoder 108, the encoder 108 may still create or provide the digital closed caption flag 134 to indicate that digital closed caption content is present within the digital closed caption data 122 and can be rendered, even though the digital closed caption flag 134 is erroneous due to at least a portion of the digital closed caption content being corrupt or missing. In some embodiments, a closed caption decoder, such as the CPD 304, may fail to recognize the digital closed caption data 122 as having an error because the checksum and/or parity bit may continue to indicate that no errors occurred during an encoding process by the encoder 108. However, if CPD 304 attempted to execute the digital closed caption data 122, at least a portion of the digital closed caption content may be missing (e.g., missing characters or null values when converted to binary) from one or more digital closed caption content packets 138 or may be corrupt within the digital closed caption content packets 138, thereby causing text or characters corresponding to the digital closed caption data 122 to not be rendered on a display of a viewing device, such as the viewing device 300. The encoder 108 can pass the digital video channel bitstream 110 to the CCIT 146 via an application programming interface prior to the digital video channel bitstream 110 being provided to customer premise equipment, such as a router or edge node that can relay the digital video channel bitstream 110 to the viewing device 300.

In some embodiments, the ACS 140 can execute the CCIT 146 via the processing unit 142 based on an initiation command that is input by an engineer 158 of an acquisition team using the input device 150. The CCIT 146 can ingest the digital video channel bitstream 110 from the encoder 108. The CCIT 146 analyzes the ancillary data 118 contained in the video data 116 so as to locate the existence of the digital closed caption flag 134. It is understood that the ancillary data 118 is supposed to contain a digital closed caption flag 134 only when all of the digital closed caption content packets 138 are present and have closed caption content that can be rendered without errors or corrupted closed caption content. If a digital closed caption flag is not present within the ancillary data 118, then the CCIT 146 interprets the lack of a digital closed caption flag as corresponding with no digital closed caption data. However, once the CCIT 146 locates the digital closed caption flag 134, the CCIT 146 can confirm that the digital closed caption flag 134 indicates that all of the digital closed caption content packets 138 are present within the digital video channel bitstream 110 and that all of the digital closed caption content packets 138 can be rendered to provide digital closed caption content to the viewing device 300. To confirm that the digital closed caption flag 134 is not presenting a false positive (i.e., falsely conveying that no errors exist within the digital closed caption content packets 138) the CCIT 146 may verify that at least one closed caption service, such as one of the caption service A 130 or the caption service N 132, has been assigned to the digital closed caption data 122 corresponding to the digital closed caption flag 134. A field on a user interface may be populated to indicate which closed caption service has been assigned to the digital closed caption data 122.

The CCIT 146 may continue to investigate whether the digital closed caption flag 134 is correctly conveying a lack of errors by identifying and analyzing closed caption hexadecimal data, such as the closed caption hexadecimal data 136 that follows the digital closed caption flag 134. A visual depiction of an embodiment of the closed caption hexadecimal data 136 on a screen display 200 will be discussed with respect to FIG. 2. In some embodiments, the CCIT 146 may determine that at least one of the digital closed caption content packets 138 contains a null value following the digital closed caption flag 134. The CCIT 146 can use a mapping table to determine that the presence of the null value indicates that at least a portion of the digital closed caption content packet 138 cannot be rendered. In some embodiments, null values in combination with non-null values may populate the digital closed caption content packets 138, thereby indicating that at least some of the digital closed caption content packet 138 is corrupt and cannot be rendered. Thus, despite the encoder 108 providing the digital closed caption flag 134 to indicate that all of the digital closed caption content packets 138 are present and capable of being rendered, the CCIT 146 can determine, via inspection of the closed caption hexadecimal data 136, that errors are present within the digital closed caption content packets 138. In some embodiments, the CCIT 146 may attempt to decode the portion of the digital closed caption content packet 138 that is missing digital closed caption content and/or has corrupted digital closed caption content in order to confirm that an error is present within the digital closed caption data 122. In some embodiments, the CCIT 146 will determine a time marker corresponding to the digital closed caption content packet 138 that contains the error. The time marker can be used to identify the chronological location the digital closed caption content packet 138 is located within the digital video channel bitstream 110.

In some embodiments, once the CCIT 146 has determined that at least some of the digital closed caption content packets 138 cannot be rendered, the CCIT 146 may determine whether errors exist corresponding to the analog closed caption data 120. For example, the CCIT 146 can determine that the digital video channel bitstream 110 contains the analog closed caption flag 128 within the analog closed caption data 120. By the analog closed caption flag 128 being present within the analog closed caption data 120, the analog closed caption flag 128 indicates that analog closed caption content is present within each of the analog closed caption content packets 137 of the analog closed caption data 120. The analog closed caption flag 128 also can signify that each of the analog closed caption content packets 137 can be rendered for display of analog closed caption content. The CCIT 146 can confirm whether the presence of the analog closed caption flag 128 is a false positive (i.e., whether the analog closed caption flag 128 is correctly conveying that no errors exist within the analog closed caption data 120). In some embodiments, the CCIT 146 can confirm whether a false positive exists by verifying that at least one closed caption service, such as one of the caption service A 130 and/or the caption service N 132, is assigned to the field 1 124 and the field N 126 of the analog closed caption data 120. For example, if caption service A 130 is a closed caption service for English speakers and the caption service A 130 is populated in the field 1 124 of the analog closed caption data 120, then the CCIT 146 would have confirmed that at least one closed caption service has been assigned to the analog closed caption data 120. In some embodiments, the CCIT 146 also may locate and analyze analog closed caption content packets 137 within the closed caption hexadecimal data 136 that follows the analog closed caption flag 128. If the CCIT 146 determines that no null values exist within the analog closed caption content packets 137, then the CCIT 146 has verified that all of the analog closed caption content packets 137 contain analog closed content which can be rendered to display text and characters on the viewing device 300.

In some embodiments, the CCIT 146 can instantiate an alert, such as an alert 149, based on the determination that at least a portion of the digital closed caption content packets 138 cannot be rendered due to at least some of the digital closed content being corrupt or missing. Each occurrence of one of the digital closed caption content packets 138 missing digital closed caption content and/or having content that is corrupt can trigger the CCIT 146 to instantiate an alert, such as the alert 149. In some embodiments, the CCIT 146 can create and/or retrieve an error log, such as the error log 147, that corresponds to the channel identifier associated with the digital video channel bitstream 110. An instance of the error log 147 can be stored in the memory 144 of the ACS 140. In some embodiments, CCIT 146 creates a closed caption channel report 148 that can be periodically sent (e.g., monthly, quarterly, etc.) to the content provider server 102 for review by the content provider. The closed caption channel report 148 can be generated for the digital video channel bitstream 110 so as to capture a history of the alert 149, including time and frequency of occurrence. In some embodiments, the closed caption channel report 148 can include each instance of the alert 149 and a copy of the error log 147 so that the content provider server 102 can detect whether any digital channel bitstreams on other service providers (i.e., service providers that are not associated with the ACS 140) are experiencing errors. In some embodiments, the ACS 140 may request a confirmation as to whether other service providers are experiencing errors with the digital closed caption flag 134 being presented as a false positive as well.

In some embodiments, the CCIT 146 can create a prompt 302 that requests confirmation to authorize use of analog closed caption content from the analog closed caption data 120 due to at least a portion of the digital closed caption content not existing and/or being corrupt within the digital closed caption content packet 138 of the digital closed caption data 122. In some embodiments, the CCIT 146 can create the prompt message 145 that can carry the prompt 302 in a data structure that can be sent to the viewing device 300 to be displayed to a user 154. The CCIT 146 can generate the prompt message 145 so as to instruct the CPD 304 of the viewing device 300 to use the analog closed caption content instead using the digital closed caption content. For example, the CCIT 146 can identify a time identification marker that lists the point in time along the video data chronology in which the error will be experienced within the digital closed caption content packet 138. The CCIT 146 can identify the analog closed caption content packet 137 that has the matching time identification marker, and create a pointer within the prompt message 145 that directs the CPD 304 to use the analog closed caption content of the analog closed caption content packet 137 instead of the erroneous digital closed caption content. The CCIT 146 can provide the digital video channel bitstream 110 and the prompt message 145 to the CPD 304 of the viewing device 300. In some embodiments, the CPD 304 may use a combination of digital closed caption content and analog closed caption content during playback of the video data 116 on the viewing device 300 based on the prompt 302 that can authorize use of the analog closed caption content. An embodiment of the prompt 302 is provided and discussed with respect to FIG. 3. It is understood that the illustrated embodiment should be understood as being illustrative, and should not be construed as being limiting in any way.

Figure 2:
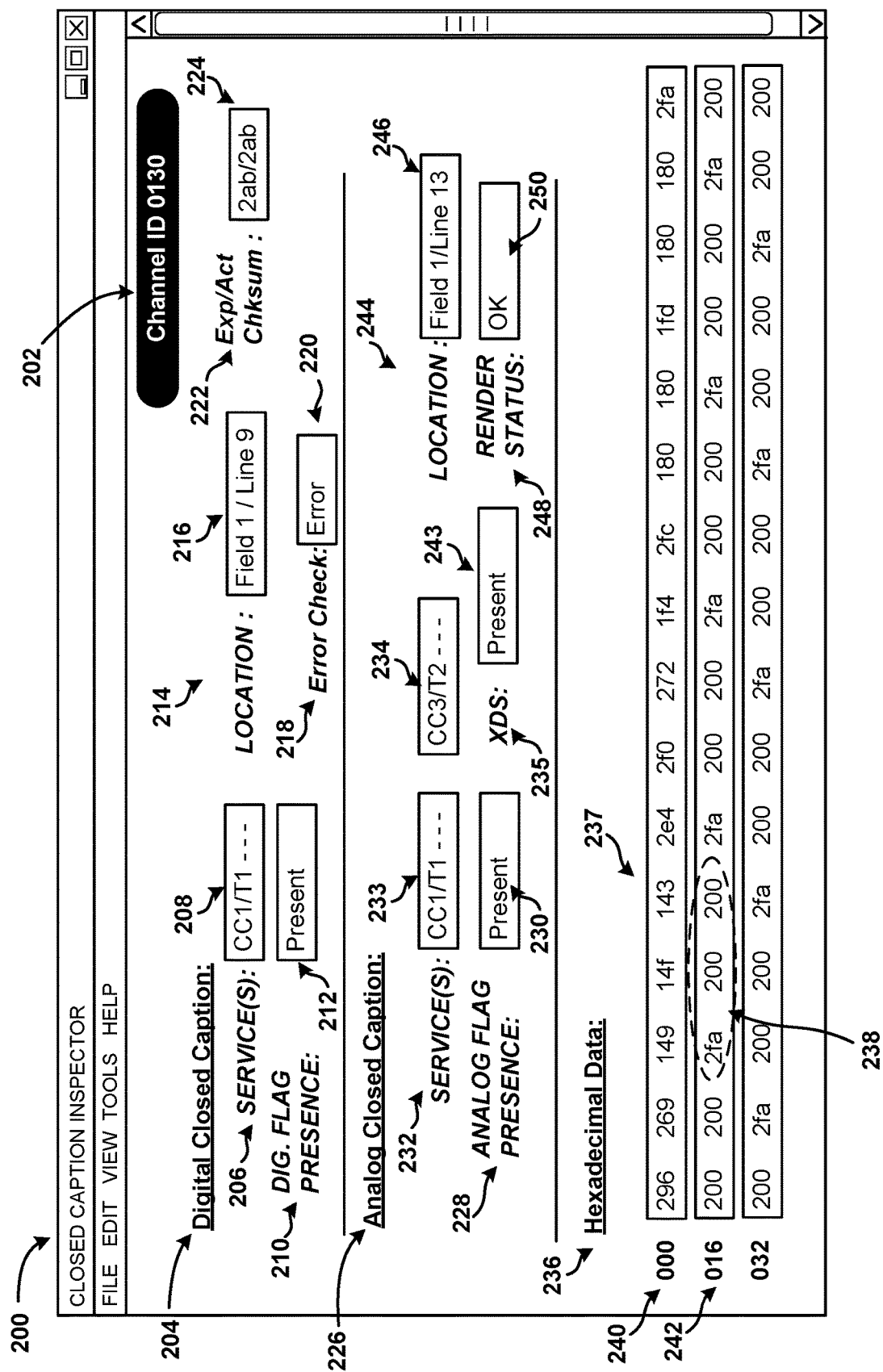
FIG. 2 is a user interface diagram showing an example screen display for inspection of closed caption data, according to an illustrative embodiment of the concepts and technologies described herein.

Turning now to FIG. 2, a user interface ("UI") diagram showing an example screen display for inspection of closed caption data, such as the analog closed caption data 120 and/or the digital closed caption data 122, will be discussed, according to an illustrative embodiment of the concepts and technologies described herein. FIG. 2 shows an illustrative screen display 200, which can be presented by a device, such as the display device 156, via execution of the CCIT 146 on the ACS 140. According to various embodiments, the ACS 140 can generate the screen display 200 and/or other screen displays in conjunction with and/or based upon interactions with the CCIT 146 described herein (e.g., via rendering images of the ancillary data 118 provided by a web portal exposed by the CCIT 146, or the like). It should be appreciated that the UI diagram illustrated in FIG. 2 is illustrative of one contemplated example of the UIs that can be generated and/or displayed in accordance with the concepts and technologies disclosed herein, and therefore should not be construed as being limited in any way.

According to various embodiments, the screen display 200 can be presented, for example, during an investigation of the frequency of closed caption corruption by an engineer 158 of an acquisition team associated with a service provider. As such, the screen display 200 can be considered a display screen for investigating ancillary data 118 used in the digital video channel bitstream 110. Because the screen display 200 illustrated in FIG. 2 can be displayed at additional and/or alternative times, it should be understood that these examples are illustrative and therefore should not be construed as being limiting in any way.

As illustrated in the embodiment in FIG. 2, the screen display 200 can include a channel identifier 202 corresponding to the digital video channel bitstream 110. The screen display 200 can have a digital closed caption section 204 and an analog closed caption section 226. The digital closed caption section 204 can include a caption service title 206 for a service field 208 that shows whether a caption service, such as one of the caption service A 130 and/or the caption service N 132 has been assigned to the digital closed caption data 122. The service field 208 can be populated to show the type of caption service that is assigned to the digital closed caption data 122. The digital closed caption section 204 also can include a location title 214 for a location field 216, where the location field 216 can be populated by the CCIT 146 with information pertaining to the line of data in which the caption service A 130 and/or the caption service N 132 is located. The digital closed caption section 204 also can include a digital flag presence title 210 for a digital closed caption flag field 212. The digital closed caption flag field 212 can be populated with an indication as to whether the digital closed caption flag 134 is present within the digital closed caption data 122. The digital closed caption section 204 also can include an error check title 218 for an error check field 220. The error check field 220 can be populated with an indication as to whether an error is showing within the digital closed caption content packets 138 despite the digital closed caption flag 134 being indicated as present within the digital closed caption flag field 212. The digital closed caption section 204 also can include an expected versus actual checksum title 222 for a checksum field 224, where the checksum field 224 can be populated with an expected checksum value versus and actual checksum value for the digital closed caption data 122. In some embodiments, the CPD 304 may rely on the expected checksum value to match the anticipated checksum value to determine whether an error exists. However, when the expected checksum value matches the actual checksum value, the CPD 304 may fail to recognize that an error has occurred. Thus, the CCIT 146 can be used to confirm that the digital closed caption data 122 has an error, such as within at least one or more of the digital closed caption content packets 138 even when the CPD 304 fails to recognize such an error.

The screen display 200 also can include the analog closed caption section 226. The analog closed caption section 226 can include an analog caption service title 232 for a first analog service field 233 and a second analog service field 234 that each show whether a caption service, such as one of the caption service A 130 and/or the caption service N 132 has been assigned to the analog closed caption data 120. Each of the first analog service field 233 and the second analog service field 234 can be populated to show the type of caption service that is assigned to the analog closed caption data 120. The analog closed caption section 226 also can include an analog location title 244 for a location field 246, where the location field 246 can be populated by the CCIT 146 with information pertaining to the line of data in which the caption service A 130 and/or the caption service N 132 is located within the analog closed caption data 120. The analog closed caption section 226 also can include an analog flag presence title 228 for an analog closed caption flag field 230. The analog closed caption flag field 230 can be populated with an indication as to whether the analog closed caption flag 128 is present within the analog closed caption data 120. The analog closed caption section 226 also can include an XDS title 235 for an XDS field 243, where the XDS field 243 indicates whether extended data services are present within the analog closed caption data 120. The analog closed caption section 226 also can include a render status title 248 for a render status field 250, where the render status field 250 can indicate whether the analog closed caption content packets 137 can be rendered for display on the viewing device 300.

The screen display 200 also can include a hexadecimal data section 236 corresponding to the closed caption hexadecimal data 136 of the digital video channel bitstream 110. A first hexadecimal line 240 can correspond with the analog closed caption data 120. The first hexadecimal line 240 can include one or more analog closed caption content packet identifiers 237, where each of the analog closed caption content packet identifiers 237 corresponds with one of the analog closed caption content packets 137 of the analog closed caption data 120. The analog closed caption content packet identifiers 237 can have characters and/or digits corresponding to analog closed caption content in a hexadecimal data format. In the illustrated embodiment, the first hexadecimal line 240 contains the analog closed caption content packet identifiers 237 that each correspond with analog closed caption content packets 137 in which analog closed caption content is present. When the analog closed caption flag 128 is present, then the closed caption hexadecimal data 136 should contain analog closed caption content within the analog closed caption content packets 137. In some embodiments, the CCIT 146 can verify that the analog closed caption content is present within the analog closed caption content packets 137 by converting the characters and/or digits of the analog closed caption content packets 137 into binary and confirming that the binary is a non-null value (i.e., non-zero value when converted to binary). The CCIT 146 can verify that the analog closed caption content is present within the closed caption hexadecimal data 136 when only non-null values are found within the analog closed caption content packets 137. The hexadecimal data section 236 also can include a second hexadecimal line 242. The second hexadecimal line 242 can include one or more digital closed caption content packet identifiers 238, where each of the digital closed caption content packet identifiers 238 corresponds with one of the digital closed caption content packets 138. The digital closed caption content packet identifiers 238 can have characters and/or digits corresponding to digital closed caption content in a hexadecimal data format. In the illustrated embodiment, the second hexadecimal line 242 contains the digital closed caption content packet identifiers 238 in which at least some of the digital closed caption content packets 138 cannot be rendered due to digital closed caption content (which make up the digital closed caption content packets 138) being missing or corrupted. Although the digital closed caption content packet identifiers 238 may display values and/or characters, the digital closed caption content may nevertheless be missing or corrupted. This may be because once the characters of the digital closed caption content packets 138 are converted from a hexadecimal format to binary, a null value may be present. The presence of a null value can indicate that the closed caption hexadecimal data 136 is missing digital closed caption content or has digital closed caption content that is corrupted. In some embodiments, the CCIT 146 can verify that the digital closed caption content is missing or corrupted within at least a portion of the digital closed caption content packets 138 by converting the characters and/or digits into binary and confirming that the binary contains a null value (i.e., a zero value). In some embodiments, the CCIT 146 can determine that digital closed caption content is missing when one or more (or all) of digital closed caption content packets 138 contain only null values. For example, as shown in screen display 200, the digital closed caption content packet identifier 238 shows the digits "200" which are repeated and visually signify a null value contained in one of the digital closed caption content packets 138. The CCIT 146 can interpret the "200" as corresponding with only null values, thereby indicating that at least one of the digital closed caption content packets 138 is missing digital closed caption content. In some embodiments, the CCIT 146 can determine that digital closed caption content is corrupt when one or more of the digital closed caption content packets 138 contain a null value alongside non-null values (e.g., null value with digits "200" alongside non-null values with digits "149").

In some embodiments, the digital closed caption data 122 may be configured so as to be backwards compatible with analog closed caption content from the analog closed caption packets 137 of the analog closed caption content data 120. For example, if the analog closed caption flag 128 is present and the digital closed caption flag 134 is present, but the digital closed caption content packets 138 are missing digital closed caption content (or at least a portion of the digital closed caption content is corrupt), then the CCIT 146 can pull, copy, and/or otherwise obtain analog closed caption content from the analog closed caption content packets 137 for use in lieu of at least some of the digital closed caption content. In some instances, if all of the digital closed caption content is missing from the digital closed caption content packets 138, then the CCIT 146 can create a redirection instruction within the prompt message 145 so as to instruct the CPD 304 to use at least some of the analog closed caption content from the analog closed caption content packets 137.

In an alternate embodiment, the CCIT 146 can determine that the analog closed caption flag 128 is present but that the digital closed caption flag 134 is not present. This could be represented on the screen display 200 as the digital closed caption flag field 212 being populated with the phrase "not present" or variants thereof. In this alternate embodiment, although the digital closed caption flag 134 is not present, the CCIT 146 may determine that the closed caption hexadecimal data 136 contains digital closed caption content packets 138 that, in turn, have digital closed caption content. However, the CCIT 146 may determine that the digital closed caption content within the digital closed caption content packets 138 cannot be decoded by the CPD 304, and thus cannot be displayed or rendered by the CPD 304 of the viewing device 300. The CCIT 146 may instantiate an alert and/or include the error in the error log 147. In some embodiments, the CCIT 146 can create the prompt message 145 when one or more of the digital closed caption content packets 138 cannot be decoded such that the CPD 304 can display analog closed caption content instead of the faulty digital closed caption content.

In yet another alternate embodiment, the CCIT 146 may determine that the analog closed caption flag 128 is present, the digital closed caption flag 134 is present, and that all of the analog closed caption content packets 137 have analog closed caption content present and able to be rendered, and all of the digital closed caption content packets 138 have digital closed caption content that is present and able to be rendered. In some aspects, the digital closed caption content of the digital closed caption content packets 138 is configured to be assigned to a container that is to be displayed as a digital closed caption text window on an interface, such as on the viewing device 300. The ancillary data 118 may define a pixel column value corresponding to a number of pixel columns that make up a width assigned to the digital closed caption text window. The CCIT 146 can determine whether the digital closed caption text window is being assigned dimensions that are too large for the viewing device by identifying whether the pixel column value number is greater than a standard pixel column width that is stored as a standard width value in the memory 144. If so, then the digital closed caption content cannot be decoded by the CPD 304 and the CCIT 146 may instantiate an alert and/or record the error in the error log 147. In some embodiments, the CCIT 146 may rewrite, prior to providing the digital video channel bitstream 110 to the viewing device 300, the pixel column value number so as to conform to standard width value.

It should be understood that the example embodiments are illustrative and therefore should not be construed as being limiting in any way. It should be understood that the fields, titles, and/or other information shown in the embodiment of the screen display 200 are illustrative and the screen display 200 provided by the CCIT 146 can include various menus and/or menu options, fields, or other information not shown in FIG. 2. Because additional or alternative controls can be included in the screen display 200, it should be understood that the example embodiment shown in FIG. 2 is illustrative and therefore should not be construed as being limiting in any way.

Figure 3:
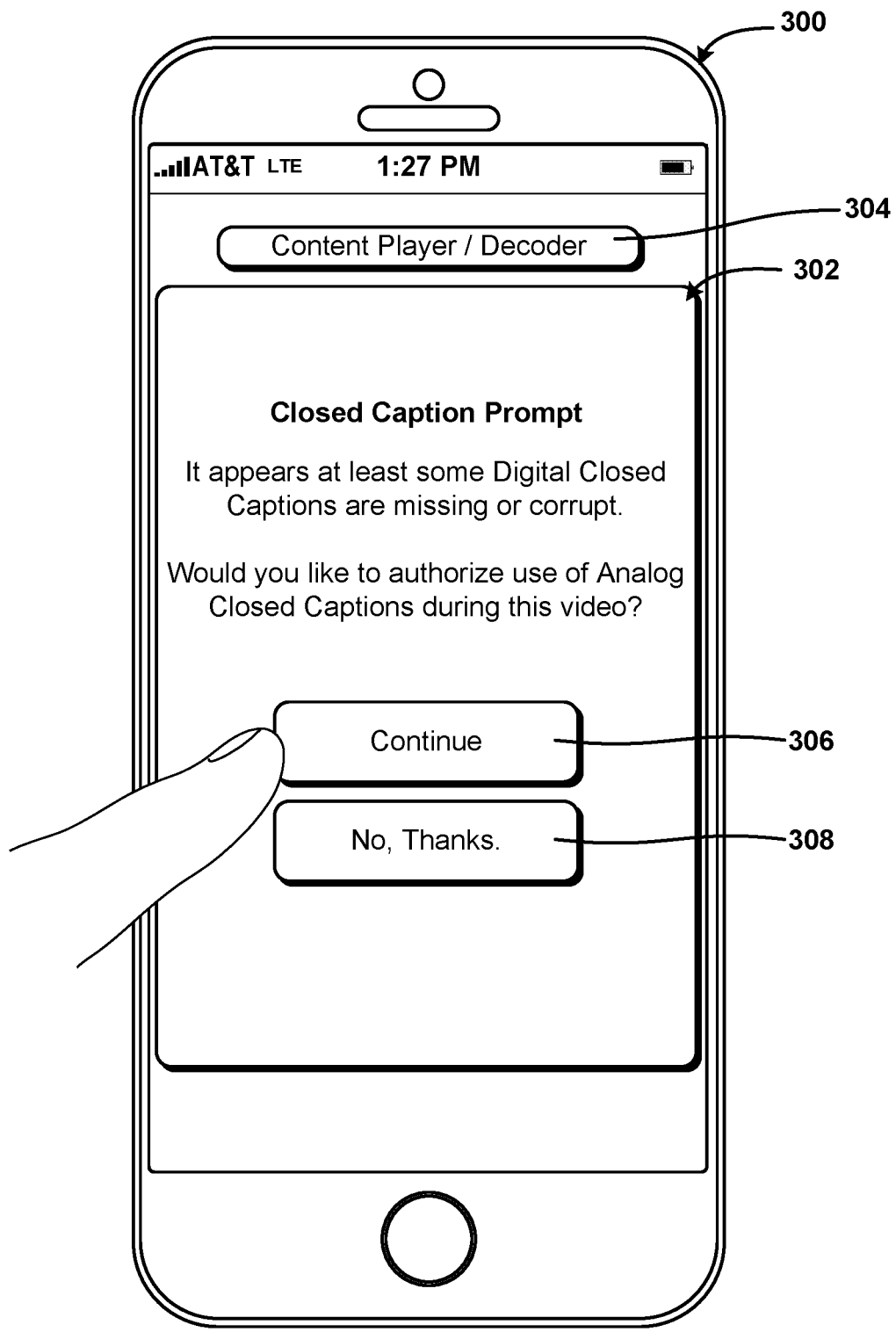
FIG. 3 is a user interface diagram showing an example closed caption prompt, according to an illustrative embodiment of the concepts and technologies described herein.

Turning now to FIG. 3 with continued reference to FIG. 1, a user interface diagram showing an example closed caption prompt on a viewing device, such as the viewing device 300, is disclosed. The viewing device 300 can include the CPD 304 that can decode and playback the digital video channel bitstream 110. In the illustrated embodiment, the viewing device 300 can receive the prompt 302 in the prompt message 145 from the ACS 140 as shown in FIG. 1. The prompt 302 can be executed by a processor of the viewing device 300 so as to be presented on a display of the viewing device 300. In an embodiment, the prompt 302 can inform a user, such as the user 154, that at least some digital closed caption content is missing or has been corrupted. The prompt 302 can provide authorization options, such as a continue option 306 and a decline option 308. The continue option 306 can correspond with a user granting authorization to use analog closed caption content for at least a portion of video playback from the digital video channel bitstream 110. In response to the user selecting the continue option 306, the CPD 304 can use a pointer within the prompt message 145 so as to use the analog closed caption content packets 137 when the CPD 304 encounters the error in the digital closed caption content packets 138 at the indicated time identifier. In some embodiments, in response to the user selecting the decline option 308, the CPD 304 will not use the analog closed caption content packets 137. In some embodiments, the CPD 304 may send a status response back to the CCIT 146 of the ACS 140 indicating whether the user selected the continue option 306 or the decline option 308. In some embodiments, the user selection can be included in the closed caption channel report 148 that is provided to the content provider server 102. It should be understood that the example embodiment shown in FIG. 3 is illustrative and therefore should not be construed as being limiting in any way.

Figure 4:
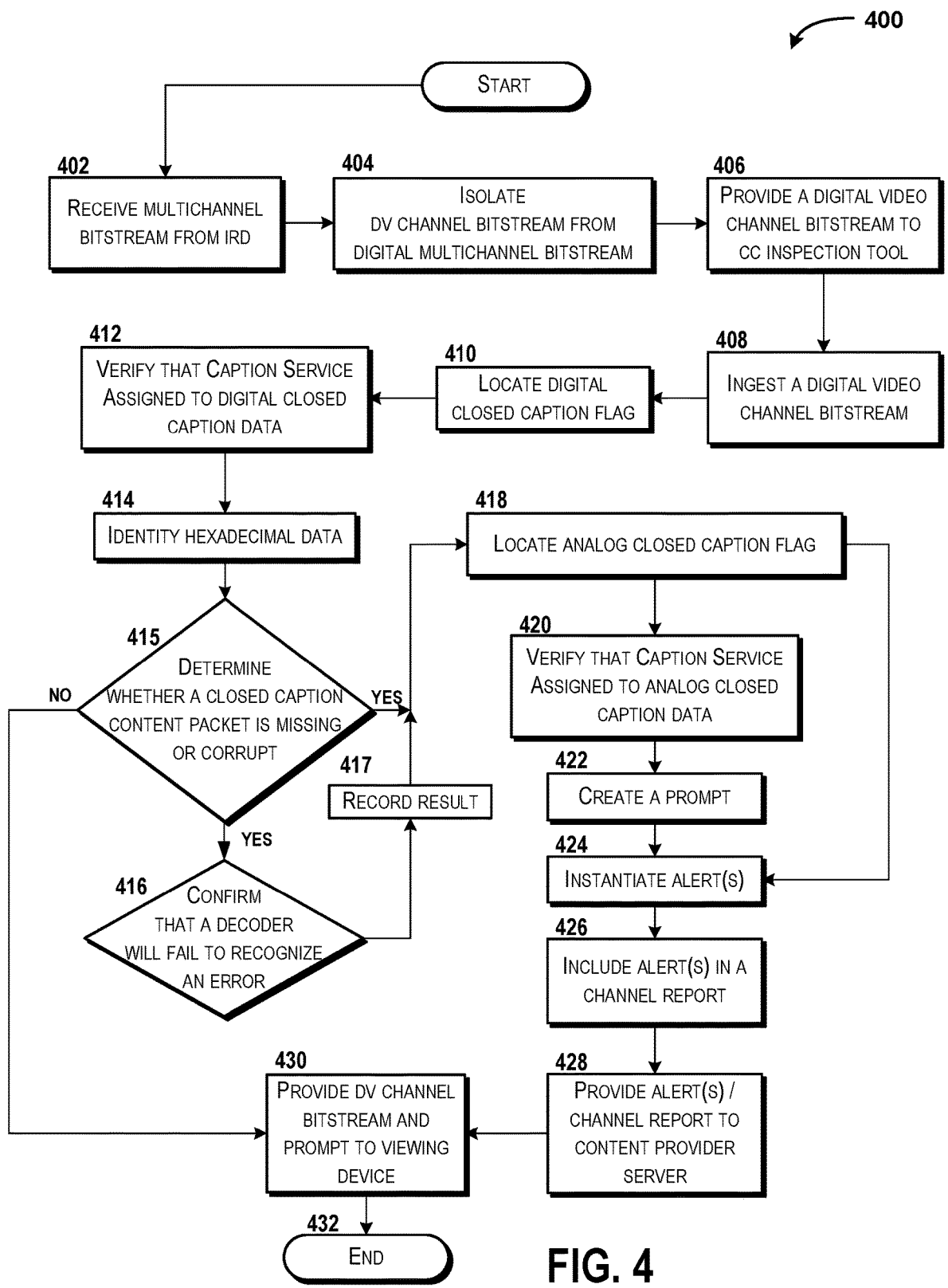
FIG. 4 is a flow diagram showing aspects of a method for closed caption corruption reporting, according to an illustrative embodiment of the concepts and technologies described herein.

Turning now to FIG. 4, aspects of a method 400 for digital closed caption corruption reporting will be described in detail, according to an illustrative embodiment. It should be understood that the operations of the method disclosed herein (e.g., the method 400) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the ACS 140, to perform one or more operations and/or causing the processor to direct other components of the computing system or device to perform one or more of the operations.

For purposes of illustrating and describing the concepts of the present disclosure, the methods disclosed herein are described as being performed by the ACS 140 via execution of one or more software modules such as, for example, the CCIT 146 that configure one or more processors. It should be understood that additional and/or alternative devices and/or network nodes can provide the functionality described herein via execution of one or more modules, applications, and/or other software including, but not limited to, the IRD 106 and/or the encoder 108. Thus, the illustrated embodiments are illustrative, and should not be viewed as being limiting in any way.

The method 400 begins at operation 402 in which the encoder 108 receives the digital video multichannel bitstream 107 from the IRD 106. In some embodiments, the IRD 106 can provide the digital video multichannel bitstream 107 upon request from the encoder 108 and/or based on a trigger, such as when a user of the ACS 140 accesses the CCIT 146 to request retrieval of the digital video multichannel bitstream 107. Because the digital video multichannel bitstream 107 can be obtained in any number of manners, it should be understood that these examples are illustrative and therefore should not be construed as being limiting in any way. From operation 402, the method 400 proceeds to operation 404. At operation 404, the encoder 108 can isolate one of the digital video channel bitstreams 110 from among the digital video multichannel bitstream 107. In some embodiments, the digital video channel bitstream 110 can correspond to one channel of television programming. The encoder 108 can convert and encode the digital video channel bitstream 110 according to one or more closed caption standards, such as EIA-608 and EIA-708. It should be understood that this example is illustrative and therefore should not be construed as being limiting in any way. From operation 404, the method 400 proceeds to operation 406. At operation 406, the encoder 108 can provide the digital video channel bitstream 110 to the CCIT 146 that executes on the processing unit 142 of the ACS 140.

From operation 406, the method 400 proceeds to operation 408. At operation 408, the CCIT 146 executing on the ACS 140 can ingest the digital video channel bitstream 110 from the encoder 108. The digital video channel bitstream 110 provided to the CCIT 146 can be encoded to include the digital closed caption data 122 and the analog closed caption data 120. The digital closed caption data 122 can include the digital closed caption flag 134 embedded within the ancillary data 118. From operation 408, the method 400 proceeds to operation 410. At operation 410, the ACS 140 can locate the digital closed caption flag 134 in the digital closed caption data 122 of the digital video channel bitstream 110. The digital closed caption flag 134 can indicate that one or more of the digital closed caption content packets 138 are present within the closed caption hexadecimal data 136 of the digital video channel bitstream 110.

From operation 410, the method 400 proceeds to operation 412. At operation 412, the ACS 140 can verify that at least one closed caption service, such as the caption service A 130 and/or the caption service N 132, has been assigned to the digital closed caption data 122 corresponding to the digital closed caption flag 134. In some embodiments, the ACS 140 can provide the verification by ensuring that the first analog service field 233 and the second analog service field 234 are populated with information pertaining to a closed caption service and/or text. From operation 412, the method 400 proceeds to operation 414. At operation 414, the ACS 140 can identify the closed caption hexadecimal data 136 following the digital closed caption flag 134. For example, the ACS 140 can locate, identify, and analyze the digital closed caption content packets 138 that are included in the closed caption hexadecimal data 136.

From operation 414, the method 400 proceeds to operation 415. At operation 415, the ACS 140 can determine whether at least one or more of the digital closed caption content packets 138, and/or a portion of one of the digital closed caption content packets 138, cannot be rendered to display digital closed caption content. If no (i.e., all of the digital closed caption content packets 138 are present, not corrupt, and not missing digital closed caption content, then the method 400 can proceed to operation 430, where the CCIT 146 can provide the digital video channel bitstream 110 to the viewing device 300. In some instances, at least the portion of the digital closed caption content packet 138 cannot be rendered due to at least one of the digital closed caption content packets missing digital closed caption content or at least a portion of the digital closed caption content packet 138 being corrupt. In some embodiments, the ACS 140 can determine whether some of the digital closed caption content packets 138 cannot be rendered by converting the characters and digits within the digital closed caption content packets 138 into binary and determining whether a null value exists within the digital closed caption content packets 138. If a null value is present, then the ACS can confirm that least a portion of the digital closed caption content packets 138 cannot be rendered to display digital closed caption content. If the CCIT 146 yields a determination of yes (i.e., at least a portion, and/or whole, of one or more digital closed caption content packets 138 such that all of the digital closed caption content cannot be rendered), then the method 400 can proceed to operation 418. In some embodiments, the method 400 can optionally include operation 416 and the method 400 can proceed to operation 416 from operation 415. At operation 416, the ACS 140 can confirm whether the CPD 304 will fail to recognize the digital closed caption data 122 as having an error. In some embodiments, this may be because the CPD 304 may rely on the matching of an expected checksum value compared to an actual checksum value to detect an error. In some embodiments, the CPD 304 may not detect an error until the CPD 304 begins to decode the portion of the digital closed caption content packets 138 that are missing the digital closed caption content and/or contain corrupted digital closed caption content. From operation 416, the method 400 proceeds to operation 417 where the CCIT 146 can record whether the CPD 304 will detect an error. If the CCIT 146 determines that the CPD 304 will recognize that the digital closed caption data 122 has an error, such as due to the checksum values not matching, then the CCIT 146 may record this result in the error log 147. If the CCIT 146 determines that the CPD 304 will fail to recognize the digital closed caption data 122 as having an error, such as due to the checksum values matching even though an error exists, then the CCIT 146 may record this result in the error log 147 and also recommend that a prompt be created so as to use analog closed caption content once an analog closed caption flag is located.

From operation 415 or 417, the method 400 proceeds to operation 418. At operation 418, the ACS 140 can locate and determine that the digital video channel bitstream 110 contains the analog closed caption flag 128 in the analog closed caption data 120. The analog closed caption flag 128 can indicate that the analog closed caption content packets 137 are present within the analog closed caption data 120 of the digital video channel bitstream 110. The presence of the analog closed caption flag 128 can also indicate that analog closed caption content within the analog closed caption content packets 137 can be rendered for display of closed caption content. From operation 418, the method 400 proceeds to operation 420. At operation 420, the ACS 140 can verify that at least one closed caption service, such as the caption service A 130 and/or the caption service N 132 has been assigned to the analog closed caption data 120 of the digital video channel bitstream 110. For example, the ACS 140 can verify that the service field 208 is populated with information pertaining to a closed caption service and/or text service.

From operation 420, the method 400 proceeds to operation 422. At operation 422, the ACS 140 can create the prompt message 145 that can include the prompt 302. The prompt 302 can be configured to receive authorization to use analog closed caption content from the analog closed caption content packets 137 of the analog closed caption data 120 when at least a portion of the digital closed caption content packet 138 of the digital closed caption data 122 cannot be rendered to display closed caption content. In some embodiments, the prompt 302 can be configured to include a pointer that allows the CPD 304 of the viewing device 300 to use the analog closed caption content instead of relying on the digital closed caption content packets 138 that contain missing or corrupt digital closed caption content. From operation 422, the method 400 proceeds to operation 424. At operation 424, the ACS 140 can instantiate an alert, such as the alert 149 based on determining that at least the portion of the digital closed caption content packets 138 cannot be rendered to display closed caption content. In some embodiments, the alert 149 can include a time identifier and a channel identifier so as to allow the content provider server 102 to correlate video playback chronology with the digital closed caption content packets 138 that have missing or corrupt digital closed caption content. In some embodiments, the alert 149 can be included in the error log 147 that is created and/or updated by the CCIT 146.

From operation 424, the method 400 proceeds to operation 426. At operation 426, the ACS 140 can include the alerts 149 within the closed caption channel report 148. The ACS 140 can generate the closed caption channel report 148 based on the content provider server 102 that originally provided the multichannel video signal 105 to the IRD 106. The closed caption channel report 148 can include one or more of the alerts 149 and the error log 147 so as to provide the content provider server 102 with information as to whether errors are occurring within the video data 116 that is provided within the digital video channel bitstream 110. From operation 426, the method 400 proceeds to operation 428 in which the ACS 140 can provide one or more of the alerts 149 to the content provider server 102 via the closed caption channel report 148. In some embodiments, the closed caption channel report 148 can be provided to the content provider server 102 via the network 104. From operation 428, the method 400 proceeds to operation 430 in which the ACS 140 can provide the digital video channel bitstream 110 to the viewing device 300. In some embodiments, the ACS 140 can embed the prompt 302 in the prompt message 145 and provide, via the network 104, the prompt message 145 to the CPD 304 of the viewing device 300. From operation 430, the method 400 proceeds to operation 432. The method 400 ends at operation 432.

Figure 5:
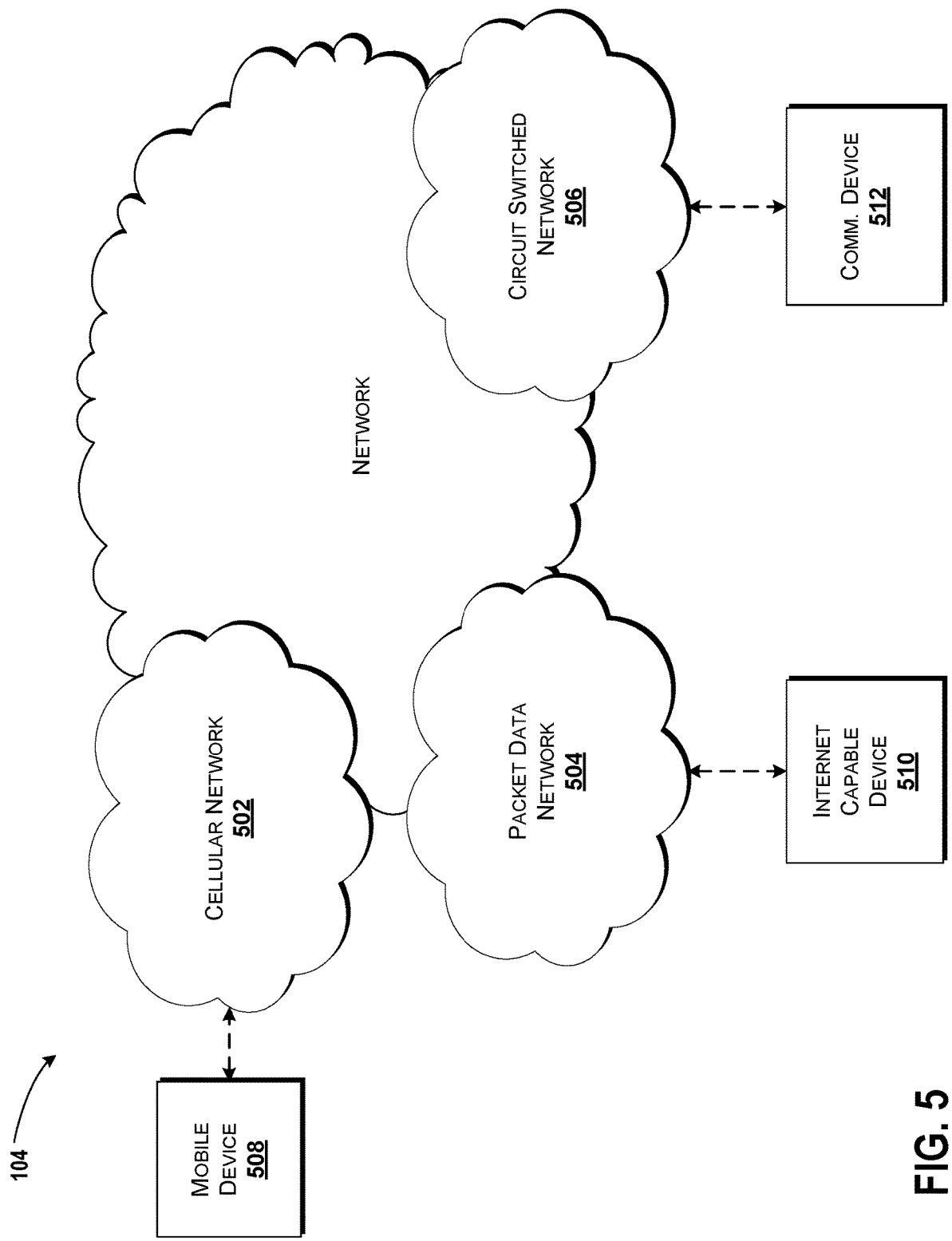
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. It is understood that, in some instances, the mobile communications device 508 can be an embodiment of the viewing device 300. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
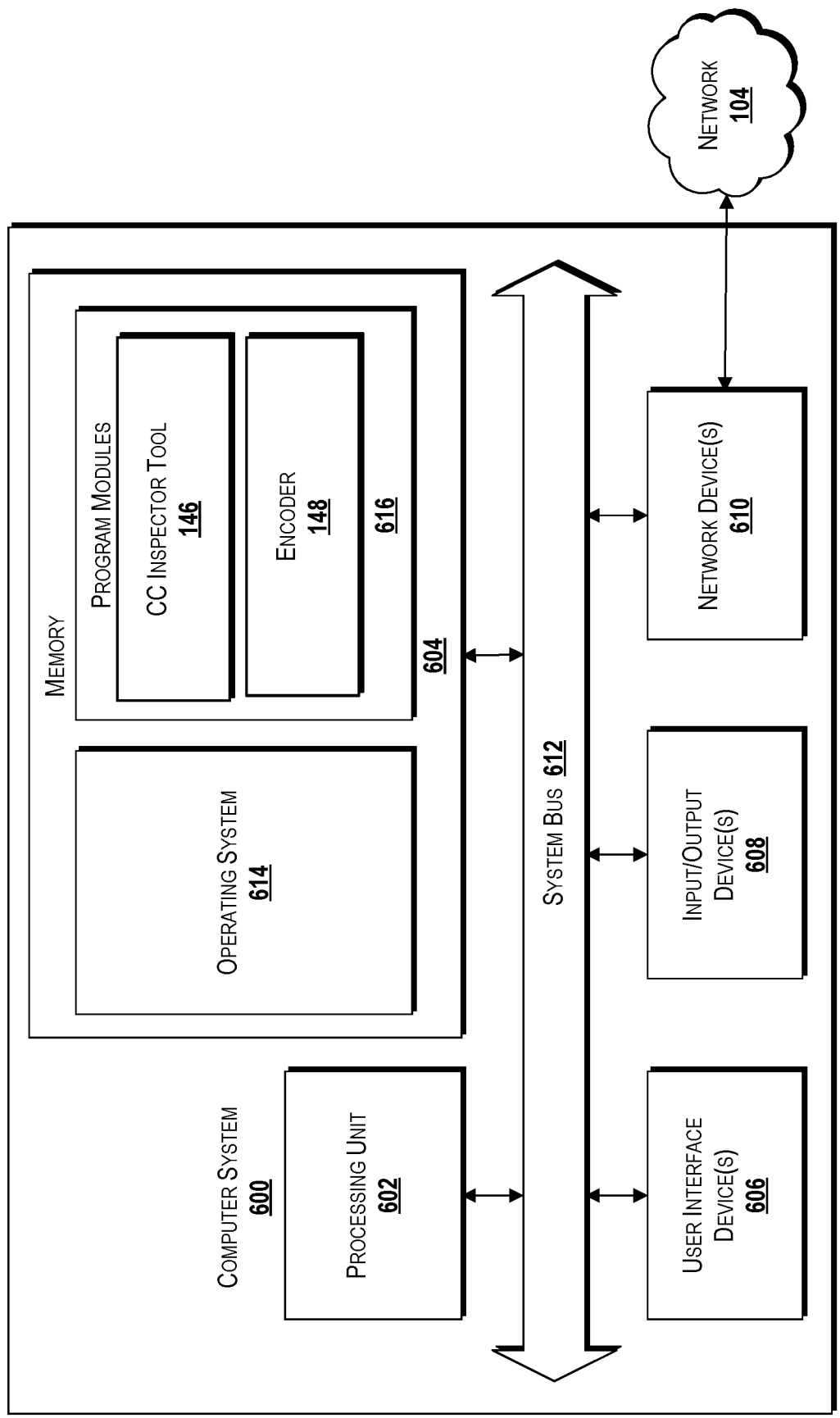
FIG. 6 is a block diagram illustrating an example computer system configured to provide, implement, and use a call handling service, according to some illustrative embodiments of the concepts and technologies described herein.

FIG. 6 is a block diagram illustrating a computer system 600 configured to provide the functionality described herein for providing and using a call handling service, in accordance with various embodiments of the concepts and technologies disclosed herein. In aspects, the ACS 140 illustrated and described herein can be configured as and/or can have an architecture similar or identical to the computer system 600. In some embodiments, the content provider server 102 can be configured as and/or have an architecture that is similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules (i.e., computer executable instructions) described herein. In some embodiments, for example, the program modules 616 include the closed caption inspector tool 146, the encoder 108, and/or other program modules. These and/or other programs can be embodied in computer-readable media containing instructions that, when executed by the processing unit 602, perform the method 400 described in detail above with respect to FIG. 4. According to some embodiments, the program modules 616 may be embodied in hardware, software, firmware, or any combination thereof. Although not shown in FIG. 6, it should be understood that the memory 604 also can be configured to store digital video channel bitstream 110, the error log 147, the prompt message 145, the alert 149, the closed caption channel report 148, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
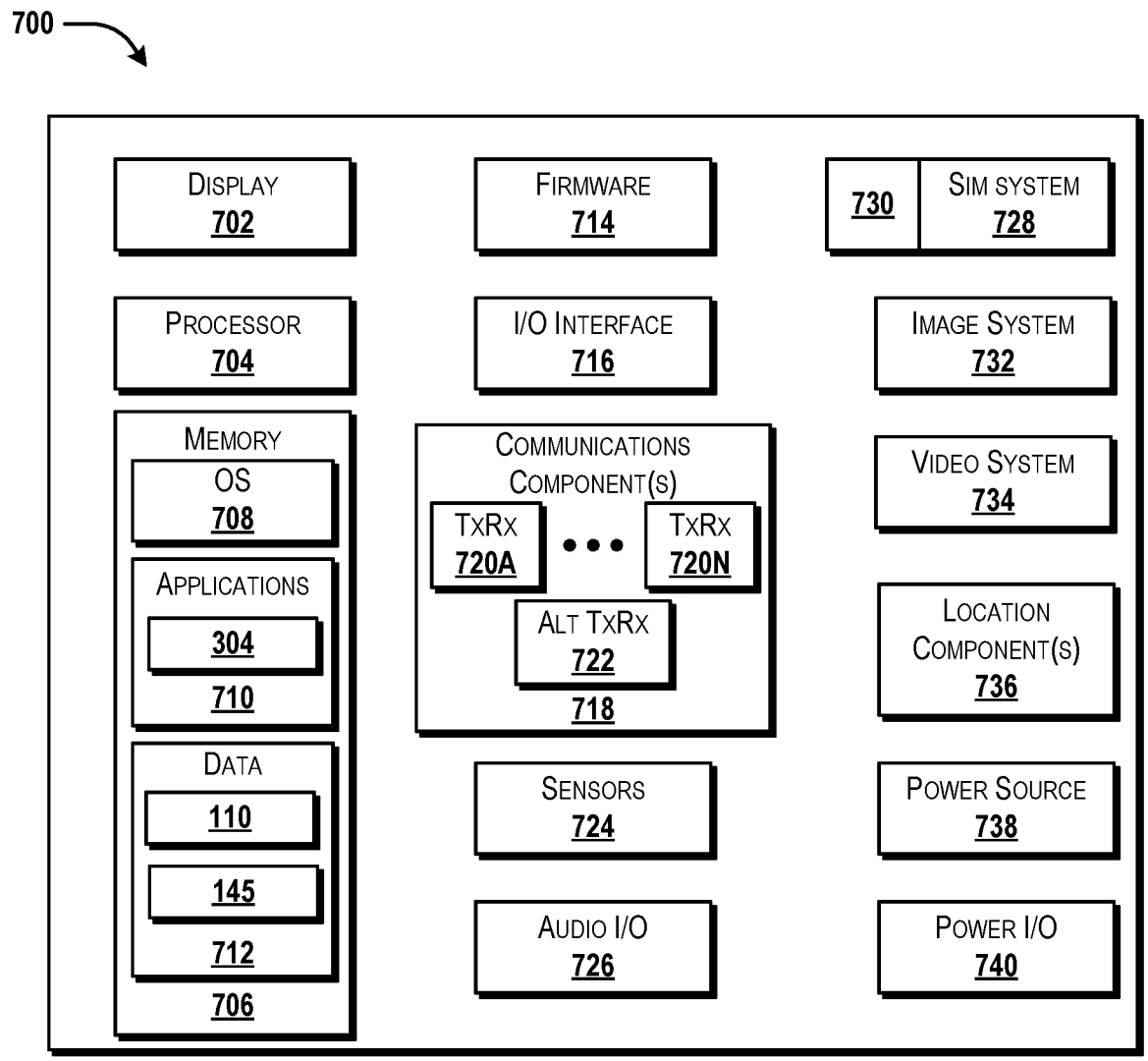
FIG. 7 is a block diagram illustrating an example mobile device configured to interact with a call handling service, according to some illustrative embodiments of the concepts and technologies described herein.

Turning now to FIG. 7, an illustrative mobile device 700 and components thereof will be described. In some embodiments, the viewing device 300 and/or other devices illustrated and described herein can be configured as and/or can have an architecture similar or identical to the mobile device 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements for responding to the prompt 302 corresponding to the reporting of closed caption corruption in the digital closed caption data 122. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the CCIT 146, the CPD 304, and/or other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in playing back the digital video channel bitstream 110, interacting with other applications 710, and otherwise facilitating user interaction with the operating system 708, the applications 710, and/or other types or instances of data 712 that can be stored at the mobile device 700. According to various embodiments, the data 712 can include, for example, presence applications, visual voice mail applications, content player and decoder (CPD) 304 application for decoding the digital video channel bitstream 110 and presenting the prompt message 145, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such a response to the prompt 302 corresponding to the continue option 306 or the decline option 308. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for digital closed caption corruption reporting for video content distribution systems via a network have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
ingesting, by a computing system comprising a processor, a digital video channel bitstream prior to the digital video channel bitstream being provided to a customer premise equipment and a viewing device;
locating, by the computing system, a digital closed caption flag in the digital video channel bitstream, wherein the digital closed caption flag indicates that a digital closed caption content packet is present within the digital video channel bitstream;
in response to locating the digital closed caption flag, determining, by the computing system, that at least a portion of the digital closed caption content packet cannot be rendered for presentation of closed caption content on a display of the viewing device despite the digital closed caption flag being present, wherein the closed caption content is associated with at least the portion of the digital closed caption content packet from the digital video channel bitstream;
determining, by the computing system, that a closed caption decoder of the viewing device will fail to recognize an error with presenting the closed caption content on the display prior to the closed caption decoder attempting to decode the portion of the digital closed caption content packet; and
instantiating, by the computing system, an alert based on determining that at least the portion of the digital closed caption content packet cannot be rendered to display the closed caption content associated with at least the portion of the digital closed caption content packet.

2. The method of claim 1, wherein at least the portion of the digital closed caption content packet cannot be rendered due to at least one of the digital closed caption content packet missing the closed caption content associated with at least the portion of the digital closed caption content packet or at least the portion of the digital closed caption content packet being corrupt.

3. The method of claim 2, further comprising:
verifying, by the computing system, that at least one closed caption service has been assigned to digital closed caption data corresponding to the digital closed caption flag; and
confirming, by the computing system, that the closed caption decoder will fail to recognize the digital closed caption data as having the error.

4. The method of claim 3, further comprising:
determining, by the computing system, that the digital video channel bitstream contains an analog closed caption flag, wherein the analog closed caption flag indicates that an analog closed caption content packet is present and can be rendered for display of closed caption content associated with the analog closed caption content packet; and
verifying, by the computing system, that at least one closed caption service has been assigned to analog closed caption data of the digital video channel bitstream.

5. The method of claim 4, further comprising creating, by the computing system, a prompt to authorize use of the closed caption content from the analog closed caption data when at least the portion of the digital closed caption content packet cannot be rendered to display the closed caption content associated with at least the portion of the digital closed caption content packet.

6. The method of claim 5, further comprising identifying, by the computing system, closed caption hexadecimal data following the digital closed caption flag, wherein the closed caption hexadecimal data comprises at least the portion of the digital closed caption content packet that cannot be rendered.

7. The method of claim 1, wherein the digital video channel bitstream is ingested from a closed caption encoder that isolates the digital video channel bitstream from a digital video multichannel bitstream.

8. A system comprising:
a processor; and
a memory storing computer-executable instructions that, in response to being executed by the processor, cause the processor to perform operations comprising:
ingesting a digital video channel bitstream prior to the digital video channel bitstream being provided to a customer premise equipment and a viewing device,
locating a digital closed caption flag in the digital video channel bitstream, wherein the digital closed caption flag indicates that a digital closed caption content packet is present within the digital video channel bitstream,
in response to locating the digital closed caption flag, determining that at least a portion of the digital closed caption content packet cannot be rendered for presentation of closed caption content on a display of the viewing device despite the digital closed caption flag being present, wherein the closed caption content is associated with at least the portion of the digital closed caption content packet from the digital video channel bitstream,
determining that a closed caption decoder of the viewing device will fail to recognize an error with presenting the closed caption content on the display prior to the closed caption decoder attempting to decode the portion of the digital closed caption content packet, and
instantiating an alert based on determining that at least the portion of the digital closed caption content packet cannot be rendered to display the closed caption content associated with at least the portion of the digital closed caption content packet.

9. The system of claim 8, wherein at least the portion of the digital closed caption content packet cannot be rendered due to at least one of the digital closed caption content packet missing the closed caption content associated with at least the portion of the digital closed caption content packet or at least the portion of the digital closed caption content packet being corrupt.

10. The system of claim 9, wherein the operations further comprise:
verifying that at least one closed caption service has been assigned to digital closed caption data corresponding to the digital closed caption flag, and
confirming that the closed caption decoder will fail to recognize the digital closed caption data as having the error.

11. The system of claim 10, wherein the operations further comprise:
determining that the digital video channel bitstream contains an analog closed caption flag, wherein the analog closed caption flag indicates that an analog closed caption content packet is present and can be rendered for display of closed caption content associated with the analog closed caption content packet, and
verifying that at least one closed caption service has been assigned to analog closed caption data of the digital video channel bitstream.

12. The system of claim 11, wherein the operations further comprise creating a prompt to authorize use of the closed caption content from the analog closed caption data when at least the portion of the digital closed caption content packet cannot be rendered to display the closed caption content associate with at least the portion of the digital closed caption content packet.

13. The system of claim 12, wherein the operations further identifying closed caption hexadecimal data following the digital closed caption flag, wherein the closed caption hexadecimal data comprises at least the portion of the digital closed caption content packet that cannot be rendered.

14. The system of claim 8, wherein the digital video channel bitstream is ingested from a closed caption encoder that isolates the digital video channel bitstream from a digital video multichannel bitstream.

15. A computer storage medium having computer-executable instructions stored thereon that, in response to execution by a processor of a system, cause the system to perform operations comprising:
ingesting a digital video channel bitstream, prior to the digital video channel bitstream being provided to a customer premise equipment and a viewing device;
locating a digital closed caption flag in the digital video channel bitstream, wherein the digital closed caption flag indicates that a digital closed caption content packet is present within the digital video channel bitstream;
in response to locating the digital closed caption flag, determining that at least a portion of the digital closed caption content packet cannot be rendered for presentation of closed caption content on a display of the viewing device despite the digital closed caption flag being present, wherein the closed caption content is associated with at least the portion of the digital closed caption content packet from the digital video channel bitstream
determining that a closed caption decoder of the viewing device will fail to recognize an error with presenting the closed caption content on the display prior to the closed caption decoder attempting to decode the portion of the digital closed caption content packet; and
instantiating an alert based on determining that at least the portion of the digital closed caption content packet cannot be rendered to display the closed caption content associated with at least the portion of the digital closed caption content packet.

16. The computer storage medium of claim 15, wherein at least the portion of the digital closed caption content packet cannot be rendered due to at least one of the digital closed caption content packet missing the closed caption content associated with at least the portion of the digital closed caption content packet or at least the portion of the digital closed caption content packet being corrupt.

17. The computer storage medium of claim 16, wherein the operations further comprise:
verifying that at least one closed caption service has been assigned to digital closed caption data corresponding to the digital closed caption flag,
confirming that the closed caption decoder will fail to recognize the digital closed caption data as having the error,
determining that the digital video channel bitstream contains an analog closed caption flag, wherein the analog closed caption flag indicates that an analog closed caption content packet is present and can be rendered for display of closed caption content associated with the analog closed caption content packet, and
verifying that at least one closed caption service has been assigned to analog closed caption data of the digital video channel bitstream.

18. The computer storage medium of claim 17, wherein the operations further comprise creating a prompt to authorize use of the closed caption content from the analog closed caption data when at least the portion of the digital closed caption content packet cannot be rendered to display closed caption content associated with at least the portion of the digital closed caption content packet.

19. The computer storage medium of claim 18, wherein the operations further comprise identifying closed caption hexadecimal data following the digital closed caption flag, wherein the closed caption hexadecimal data comprises at least the portion of the digital closed caption content packet that cannot be rendered.

20. The computer storage medium of claim 19, wherein the digital video channel bitstream is ingested from a closed caption encoder that isolates the digital video channel bitstream from a digital video multichannel bitstream.

* * * * *